United States Patent
Arai

(10) Patent No.: US 9,695,293 B2
(45) Date of Patent: Jul. 4, 2017

(54) CORONA-RESISTANT MEMBER, CORONA-RESISTANT RESIN COMPOSITION, AND METHOD FOR DEVELOPING CORONA RESISTANCE OF RESIN MOLDED ARTICLE

(71) Applicant: POLYPLASTICS CO., LTD., Tokyo (JP)

(72) Inventor: Hiroki Arai, Shizuoka (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 14/437,710

(22) PCT Filed: Oct. 24, 2013

(86) PCT No.: PCT/JP2013/078852
§ 371 (c)(1),
(2) Date: Apr. 22, 2015

(87) PCT Pub. No.: WO2014/065377
PCT Pub. Date: May 1, 2014

(65) Prior Publication Data
US 2015/0299420 A1    Oct. 22, 2015

(30) Foreign Application Priority Data
Oct. 26, 2012   (JP) .................................. 2012-236807

(51) Int. Cl.
| C08K 3/34 | (2006.01) |
| C08L 81/02 | (2006.01) |
| C08L 67/02 | (2006.01) |
| C08L 101/00 | (2006.01) |

(52) U.S. Cl.
CPC ................. *C08K 3/34* (2013.01); *C08K 3/346* (2013.01); *C08L 67/02* (2013.01); *C08L 81/02* (2013.01); *C08L 101/00* (2013.01)

(58) Field of Classification Search
CPC ............ C08K 3/34; C08L 67/02; C08L 81/02
See application file for complete search history.

(56) References Cited

U.S. PATENT DOCUMENTS

| 4,066,604 A | 1/1978 | Wang |
| 5,733,962 A * | 3/1998 | Osako ...................... C08K 3/04 524/449 |
| 5,965,273 A * | 10/1999 | Walpita .................... B32B 15/08 106/286.4 |
| 7,205,354 B2 * | 4/2007 | Kobayashi .............. C08L 71/12 359/896 |
| 2005/0068759 A1 * | 3/2005 | Takemoto ............ G02B 5/0242 362/600 |

FOREIGN PATENT DOCUMENTS

| JP | S59-79903 A | 5/1984 |
| JP | H11-53943 | 2/1999 |
| JP | H11-150848 A | 6/1999 |
| JP | 2007-254716 A | 10/2007 |
| JP | 2008-075049 A | 4/2008 |
| WO | 2009/104292 A1 | 8/2009 |

OTHER PUBLICATIONS

Machine translation of JP 2008-075049 A, Apr. 3, 2008.*
International Search Report for PCT/JP2013/078852, mail date is Dec. 17, 2013.
International preliminary Report on patentability for PCT/JP2013/078852, mail date is Apr. 28, 2015.

* cited by examiner

*Primary Examiner* — Vickey Nerangis
(74) *Attorney, Agent, or Firm* — Greenblum & Bernstein, P.L.C.

(57) ABSTRACT

A corona resistant resin composition having sufficient resistance to corona discharge, and a corona resistant member are provided. This corona resistant member is formed by molding a corona-resistant resin composition obtained by melting and mixing at least a resin component and mica, and a mode diameter of the mica in the volume-based particle size distribution measured by a laser diffraction/scattering method after molding is 1 to 200 μm. For 100 parts by mass of the resin component, there are preferably 25-101 parts by mass of mica.

11 Claims, 3 Drawing Sheets

CORONA-RESISTANT MEMBER, CORONA-RESISTANT RESIN COMPOSITION, AND METHOD FOR DEVELOPING CORONA RESISTANCE OF RESIN MOLDED ARTICLE

TECHNICAL FIELD

The present invention relates to a corona-resistant member having resistance to corona discharge, a corona-resistant resin composition to be used for molding the corona-resistant member, and a method for developing corona resistance of a resin molded article.

BACKGROUND ART

Recently, in electrical apparatuses, various resin molded articles have been used in housings and internal electrical system components. Electrical apparatuses include not only general household electric appliances and industrial electrical products, but also, for example, apparatuses that control electrical systems in vehicles such as automobiles, motorcycles and trucks, and resin molded articles are widely used in these apparatuses. As resin molded articles to be used in electrical apparatuses in vehicles, particularly apparatuses that are placed in engine rooms, those capable of resisting corona discharge caused by ignition coils etc. are required. That is, when a resin molded article is exposed to corona discharge, a dendroidal local failure called an electrical tree develops to reduce the life of the resin molded article, and such a situation must be prevented.

On the other hand, resins to be used in electrical apparatuses in vehicles are required to have heat resistance, flame retardancy and so on, and therefore polyarylene sulfide resins (hereinafter, also referred to as "PAS resins") that have the required properties are suitably used. However, the PAS resin alone does not provide sufficient corona resistance, and various attempts have been made to impart corona resistance to resin molded articles (compositions) (see, for example, Patent Documents 1 to 3).

Patent Literature 1 discloses a material (biaxially oriented film) formed of a polyphenylene sulfide (hereinafter, also referred to as a "PPS resin"), the corona resistance of which is improved by ensuring that the content of sodium chloride is not more than 0.5% by weight.

Patent Literatures 2 and 3 each disclose a molded article (cable component, snow resistant ring) formed of a resin composition containing a PAS resin, a conductive carbon black, graphite and an epoxy group-containing α-olefin-based copolymer. This is intended to improve corona resistance as well as various properties such as heat resistance, weather resistance, flame retardancy, waterproofness, airtightness, toughness and so on by setting the volume resistivity of the resin composition to a proper value.

CITATION LIST

Patent Literatures

Patent Literature 1: JP 59-79903 A
Patent Literature 2: JP 11-53943 A
Patent Literature 3: JP 11-150848 A

SUMMARY OF INVENTION

Technical Problem

The resin compositions (molded articles) described in Patent Literatures 1 to 3 provide a certain effect of corona resistance, but this is not sufficient, and there is still room for improvement. Each of the resin components of the resin compositions (molded articles) described in the above-mentioned patent literatures is a PAS resin (PPS resin), but in an environment exposed to coronal discharge, corona resistance is required regardless of the type of resin.

The present invention has been devised in view of the above-described problems of conventional techniques, and an object of the present invention is to provide a corona-resistant member having sufficient resistance to corona discharge, a corona-resistant resin composition to be used for molding the corona-resistant member, and a method for developing corona resistance of a resin molded article.

Solution to Problem

The present invention for achieving the above-mentioned object is as follows.

(1) A corona-resistant member formed by molding a corona-resistant resin composition obtained by melting and mixing at least a resin component and mica, wherein a mode diameter of the mica in a volume-based particle size distribution measured by a laser diffraction/scattering method after molding is 1 to 200 μm.

(2) The corona-resistant member according to (1), wherein the resin component is a polyarylene sulfide resin or a polybutylene terephthalate resin.

(3) The corona-resistant member according to (1) or (2), wherein the corona-resistant member contains 25 to 101 parts by mass of the mica based on 100 parts by mass of the resin component.

(4) The corona-resistant member according to any of (1) to (3), wherein the mica is oriented so as to orthogonally cross a direction of a voltage resulting from corona discharge.

(5) The corona-resistant member according to any of (1) to (4), wherein a shape of the corona-resistant member is a sheet shape, a plate shape, a cylindrical shape or a coat shape.

(6) A corona-resistant resin composition which is used for molding the corona-resistant member according to any of (1) to (5).

(7) A method for developing corona resistance of a resin molded article in which mica is added to a resin composition to develop corona resistance of a resin molded article obtained by molding the resin composition, wherein the mica is added in such a manner that a mode diameter of the mica in a volume-based particle size distribution measured by a laser diffraction/scattering method after molding is 1 to 200 μm.

Advantageous Effects of Invention

According to the present invention, there can be provided a corona-resistant member having sufficient resistance to corona discharge, a corona-resistant resin composition to be used for molding the corona-resistant member, and a method for developing corona resistance of a resin molded article.

DESCRIPTION OF EMBODIMENT

Figure 1:
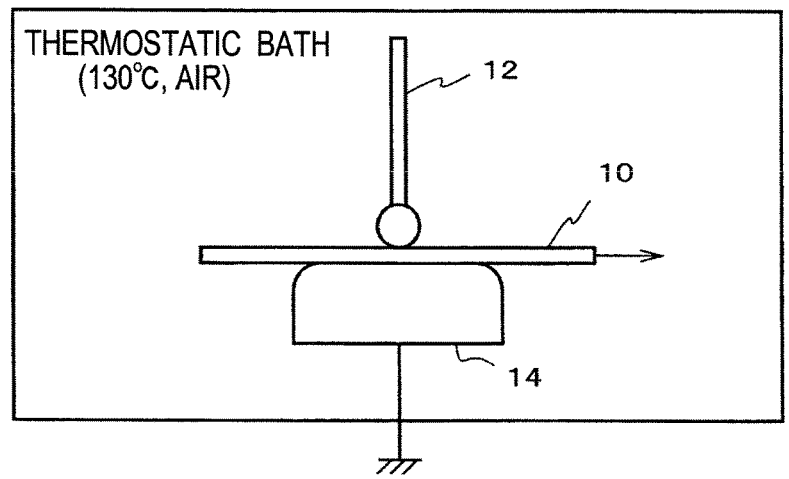
FIG. 1 is a view conceptually illustrating a layout of a test piece and electrodes in a corona resistance test.

The corona-resistant member of the present invention is a corona-resistant member formed by molding a corona-resistant resin composition obtained by melting and mixing at least a resin component and mica, wherein a mode diameter of the mica in a volume-based particle size distribution measured by a laser diffraction/scattering method after molding is 1 to 200 μm.

The corona-resistant member of the present invention is formed by molding a corona-resistant resin composition containing mica, and the plate shape of mica may efficiently hinder and retard development of a dendroidal local failure called an electrical tree which is generated when the corona-resistant member is exposed to corona discharge.

A corona-resistant resin composition to be used for molding the corona-resistant member of the present invention will be first described below.

<Corona-Resistant Resin Composition>

The corona-resistant resin composition of the present invention is used for molding the corona-resistant member, and the corona-resistant resin composition is obtained by melting and mixing a resin component and mica.

Components of the corona-resistant resin composition of the present invention will be described in detail below.

[Resin Component]

The resin component is not particularly limited, and examples thereof include polyethylene resins, polypropylene resins, polyamide resins, polyacetal resins, modified polyphenylene ether resins, polyethylene terephthalate resins, polybutylene terephthalate resins, polyethylene naphthalate resins, polyarylene sulfide resins, polyimide resins, polyamide-imide resins, polyether imide resins, polysulfone resins, polyether sulfone resins, polyether ketone resins, polyether ether ketone resins, liquid crystal resins, fluororesins, thermoplastic elastomers, and various kinds of biodegradable resins. Two or more resin components may be used in combination. Among them, polyarylene sulfide resins, polybutylene terephthalate resins (hereinafter, also referred to as "PBT resins"), polyacetal resins, liquid crystal resins and the like are collectively called engineering plastics, and used in a wide range of applications such as those of automobiles and electric/electronic components because they are excellent in mechanical properties, electrical properties, heat resistance and other physical/chemical properties, and have good processability.

PAS resins and PBT resins will be sequentially described below.

(Polyarylene Sulfide Resin)

The PAS resin is a polymer compound mainly composed of —(Ar—S)— (where Ar is an arylene group) as a repeating unit, and in the present invention, a PAS resin having a commonly known molecular structure may be used.

Examples of the arylene group include a p-phenylene group, a m-phenylene group, an o-phenylene group, a substituted phenylene group, a p,p'-diphenylene sulfone group, a p,p'-biphenylene group, a p,p'-diphenylene ether group, a p,p'-diphenylene carbonyl group and a naphthalene group. The PAS resin may be a homopolymer composed only of the above-mentioned repeating unit, or a copolymer containing different kinds of repeating units as described below may be preferred in view of processability etc.

As the homopolymer, polyphenylene sulfide resins (hereinafter, also referred to as "PPS resins") having a p-phenylene sulfide group as a repeating unit with a p-phenylene group used as an arylene group are preferably used. As the copolymer, combinations of mutually different two or more of arylene sulfide groups including the above-mentioned arylene groups may be used, and above all, combinations including p-phenylene sulfide groups and m-phenylene sulfide groups are particularly preferably used. Among them, those containing 70 mol % or more, preferably 80 mol % or more of p-phenylene sulfide groups are suitable in view of properties such as heat resistance, moldability and mechanical properties. Among these PAS resins, high-molecular-weight polymers of substantially linear structure, which are obtained by condensation polymerization of a monomer mainly composed of a difunctional halogen aromatic compound, are particularly preferably used. Two or more PAS resins different in molecular weight may be used in combination.

Besides PAS resins of linear structure, the following polymers may be used: polymers with a branched structure or a crosslinked structure partially formed using a small amount of a monomer such as an aromatic polyhalo compound having three or more halogen substituents during condensation polymerization; and polymers with molding processability improved by heating a low-molecular-weight polymer of linear structure at a high temperature in the presence of oxygen etc. to increase the melt viscosity through oxidation crosslinking or thermal crosslinking.

The melt viscosity (shear velocity at 310° C.: 1216 sec$^{-1}$) of the PAS resin as a base resin for use in the present invention is preferably 600 Pa·s or less including the above-mentioned mixture systems, and above all, PAS resins having a melt viscosity in a range of 8 to 300 Pa·s are particularly preferred because they are excellent in balance between mechanical properties and fluidity.

(Polybutylene Terephthalate Resin)

The PBT resin is a polybutylene terephthalate-based resin obtained by polycondensation of a dicarboxylic acid component that contains at least a terephthalic acid or an ester-forming derivative thereof (a lower alcohol ester) and a glycol component that contains at least an alkylene glycol (1,4-butanediol) having four carbon atoms or an ester-forming derivative thereof (acetylated product etc.). The PBT resin is not limited to a homo PBT resin, and may be a copolymer (copolymer PBT resin) containing 60 mol % (particularly not less than 75 mol % and not more than 95 mol %) of butylene terephthalate units.

Examples of the dicarboxylic acid component (comonomer component) other than the terephthalic acid and ester-forming derivative thereof in the copolymer PBT resin include aromatic dicarboxylic acid components ($C_6$-$C_{12}$ aryl dicarboxylic acids such as isophthalic acid, phthalic acid, naphthalenedicarboxylic acid and diphenyl ether dicarboxylic acid), aliphatic dicarboxylic acid components ($C_4$-$C_{16}$ alkyldicarboxylic acids such as succinic acid, adipic acid, azelaic acid and sebacic acid, and $C_5$-$C_{10}$ cycloalkyldicarboxylic acids such as cyclohexanedicarboxylic acid), and ester-forming derivatives of these dicarboxylic acid components. These dicarboxylic acid components may be used alone, or used in combination of two or more thereof.

Preferred dicarboxylic acid components (comonomer components) include aromatic dicarboxylic acid components (particularly $C_6$-$C_{10}$ aryl dicarboxylic acids such as isophthalic acid), and aliphatic dicarboxylic acid components (particularly $C_6$-$C_{12}$ alkyldicarboxylic acids such as adipic acid, azelaic acid and sebacic acid).

Examples of the glycol component (comonomer component) other than 1,4-butanediol in the PBT resin include aliphatic diol components [e.g. alkylene glycols ($C_2$-$C_{10}$ alkylene glycols such as ethylene glycol, propylene glycol, trimethylene glycol, 1,3-butylene glycol, hexamethylene glycol, neopentyl glycol and 1,3-octanediol; polyoxy $C_2$-$C_4$ alkylene glycols such as diethylene glycol, triethylene glycol and dipropylene glycol; etc.), cycloaliphatic diols such as cyclohexane dimethanol and hydrogenated bisphenol A, etc.], aromatic diol components [aromatic alcohols such as bisphenol A and 4,4-dihydroxybiphenyl, $C_2$-$C_4$ alkylene oxide adducts of bisphenol A (e.g. ethylene oxide 2 mole adducts of bisphenol A, propylene oxide 3 mole adducts of bisphenol A, etc.), etc.], and ester-forming derivatives thereof. These glycol components may be used alone, or used in combination of two or more thereof.

Preferred glycol components (comonomer components) include aliphatic diol components (particularly cycloaliphatic diols such as $C_2$-$C_6$ alkylene glycols, polyoxy $C_2$-$C_3$ alkylene glycols such as diethylene glycol, and cyclohexanone dimethanol).

Either a homo PBT resin or copolymer PBT resin generated by polycondensation using the above-mentioned compound as a monomer component may be used as a resin composition of the present invention. Homo PBT resins and copolymer PBT resins may be used alone, or used in combination of two or more thereof.

[Mica]

Mica is a scalelike aluminum silicate-based mineral, and examples thereof include white mica ($KAl_2(AlSi_3O_{10})(OH)_2$), amber mica ($KMg_3(AlSi_3O_{10})(OH)_2$), black mica ($K(Mg, Fe)_3(AlSi_3O_{10})(OH)_2$) and lepidolite ($KLi_2Al(Si_4O_{10})(OH)_2$).

Among them, amber mica is preferably used because the effect of corona resistance can be most remarkably exerted.

Examples of mica (commercial product) that can be used in the present invention include 150-S (average particle diameter (50% d): 163 μm), 325-S (average particle diameter (50% d): 30 μm) and 60-S (average particle diameter (50% d): 278 μm) each manufactured by Western Japan Trading Co., Ltd. as amber mica, and AB-25S (average particle diameter (50% d): 24 μm) manufactured by YAMAGUCHI MICA CO., LTD. as white mica.

The average particle diameter (50% d) means a median diameter at 50% of the integrated value in a particle size distribution measured by a laser diffraction/scattering method.

The content of mica is preferably 25 to 101 parts by mass, more preferably 40 to 70 parts by mass based on 100 parts by mass of the PAS resin for obtaining sufficient corona resistance.

In the present invention, glass fibers may be added for improving mechanical properties (tensile strength and flexural strength). The glass fibers are not particularly limited, and those that are commercially available may be used. Examples of glass fibers that are sold as commercial products include chopped glass fibers (CS03DE 416A, average fiber diameter: 6 μm) manufactured by Owens Corning Corporation, chopped glass fibers (ECSO3T-747H, average fiber diameter: 10 μm) manufactured by Nippon Electric Glass Co., Ltd., and chopped glass fibers (ECSO3T-747, average fiber diameter: 13 μm) manufactured by Nippon Electric Glass Co., Ltd.

[Other Components]

The corona-resistant resin composition according to the present invention may contain a lubricant, carbon black, a nucleating agent, a flame retardant, a flame retardant aid, an antioxidant, a metal deactivator, other age resisters, a UV absorber, a stabilizer, a plasticizer, a pigment, a dye, a colorant, an antistatic agent, a foaming agent, other polymers such as resins, and other additives within the bounds of not hindering the effect of the present invention.

<Method for Developing Corona Resistance of Resin Molded Article>

The method for developing corona resistance of a resin molded article according to the present invention is a method in which mica is added to a resin composition to develop corona resistance of a resin molded article obtained by molding the resin composition, wherein the mica is added in such a manner that a mode diameter of the mica in a volume-based particle size distribution measured by a laser diffraction/scattering method after molding is 1 to 200 μm.

As described above, the corona-resistant member contains mica, so that corona resistance is developed. In other words, when a resin composition is molded with predetermined mica added thereto in such a manner that the mode diameter etc. of the mica in a member after molding falls within the range specified above, corona resistance can be developed in the member as a molded article of the resin composition.

The resin component and mica in the method for developing corona resistance of a resin molded article are identical to the resin composition and mica in the above-described corona-resistant resin composition of the present invention, and the same applies for preferred examples and added amounts of components for developing corona resistance, and other components that can be added.

<Corona-Resistant Member>

The corona-resistant member of the present invention is formed by molding the above-described corona-resistant resin composition of the present invention, the method for preparing the corona-resistant member is not particularly limited, and a known method may be employed. For example, a corona-resistant resin composition of the present invention as described later is fed into an extruder, melted and mixed, and pelletized, and the resulting pellets are fed into an injection molding machine equipped with a predetermined mold, and injection-molded to prepare the corona-resistant member.

In the corona-resistant member of the present invention, mica in the corona-resistant member has a mode diameter of 1 to 200 μm, preferably 15 to 150 μm, more preferably 40 to 130 μm in a volume-based particle size distribution measured by a laser diffraction/scattering method. When the mode diameter of the mica in the corona-resistant member falls out of the range of 1 to 200 μm, the effect of corona resistance tends to be reduced.

The mode diameter of mica in the corona-resistant member can be measured by a laser diffraction/scattering particle size distribution measuring apparatus LA-920 manufactured by HORIBA, Ltd.

Preferably, the corona-resistant member of the present invention has mica oriented so as to orthogonally cross a direction of a voltage resulting from corona discharge. Specifically, it is preferred that when a voltage is applied to the corona-resistant member, mica is oriented so as to orthogonally cross a direction in which the voltage is applied, in other words micas in the corona-resistant member are oriented in one direction so as to be parallel to one another in such a manner that the mica orthogonally crosses the direction of a voltage resulting from corona discharge. When the orientation direction of mica orthogonally crosses the direction of a voltage resulting from corona discharge, the normal direction of mica and the direction of a voltage resulting from corona discharge coincide with each other, but the normal direction and the voltage direction are not required to completely coincide with each other, and may be deviated from each other within the bounds of not impairing the effect of the present invention.

The orientation state of the mica will be described below with reference to FIGS. 2 and 3.

Figure 2:
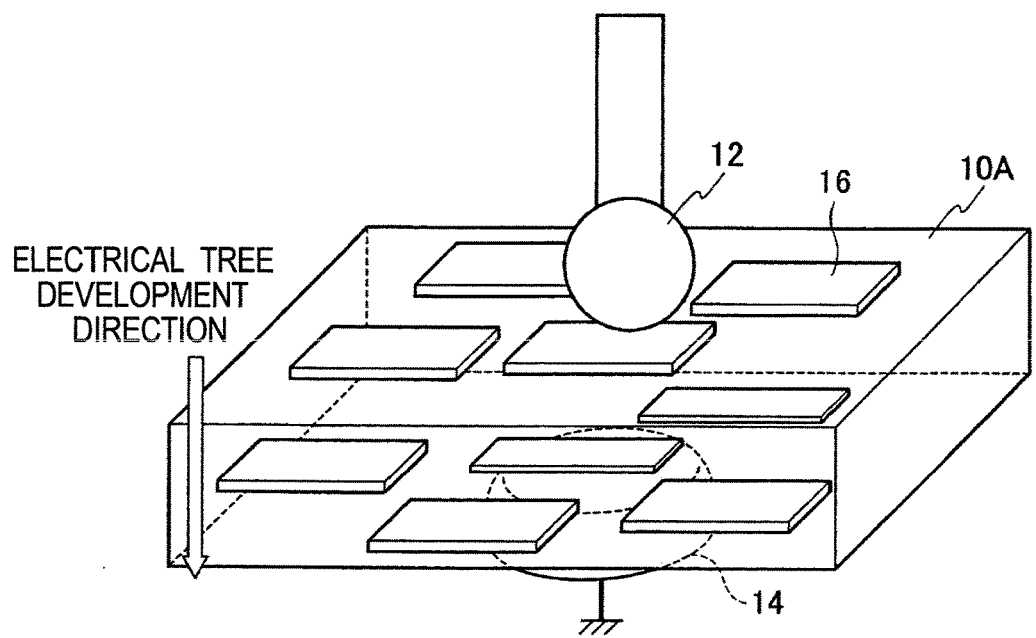
FIG. 2 is a view schematically illustrating a state in which a voltage is applied to a corona-resistant member with mica oriented so as to maximally exert an effect of corona resistance.
Figure 3:
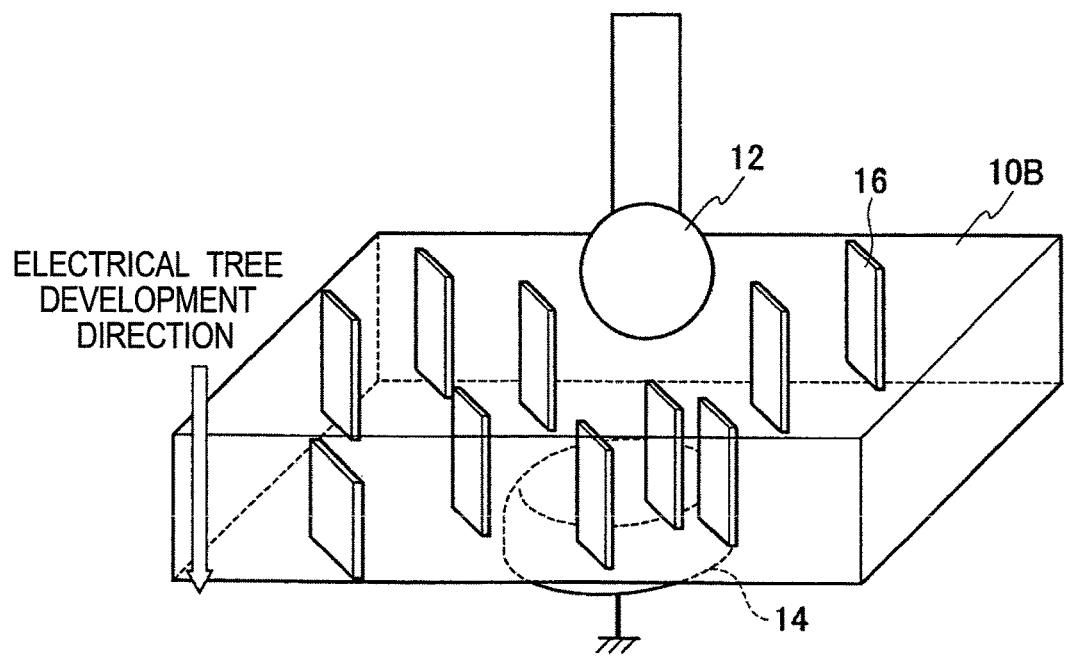
FIG. 3 is a view schematically illustrating a state in which a high voltage is applied to a corona-resistant member with mica oriented in a direction different from that in FIG. 2.

FIGS. 2 and 3 schematically illustrate a state in which a high voltage is applied to the corona-resistant member. In FIGS. 2 and 3, a high-voltage-side electrode 12 is disposed above flat plate-shaped corona-resistant members 10A and 10B and an earth-side electrode 14 is disposed below the corona-resistant members, and when a high frequency/high voltage is applied by both the electrodes, corona discharge is generated in the vicinity of the tip of the high-voltage-side electrode 12, so that the surfaces of corona-resistant members 10A and 10B are exposed to corona discharge. In FIG. 2, mica 16 is oriented in the corona-resistant member 10A so as to orthogonally cross a direction in which a voltage is applied, and in FIG. 3, mica 16 is oriented in the corona-resistant member 10B so as to run parallel to the voltage direction. In this configuration, corona discharge is generated by applying a high frequency/high voltage. In this case, in the configuration in FIG. 2, mica 16 is oriented so as to hinder development of an electrical tree if it is generated, and therefore development of the electrical tree can be retarded. Hence, it is considered that the life of the corona-resistant member 10A can be increased. On the other hand, in the configuration in FIG. 3, many gaps exist in the development direction of the electrical tree, so that the effect of hindering development of the electrical tree is small.

Thus, when the corona-resistant member with mica oriented as shown in FIG. 2 is disposed in such a manner that the mica in the corona-resistant member orthogonally crosses the applied direction of a voltage resulting from corona discharge, the effect of corona resistance can be more effectively exerted.

Thus, mica in the corona-resistant member can be oriented in a direction as described above by, for example, setting the position of a gate of a mold in such a manner that a desired direction in which mica is oriented is identical to a resin flow direction during injection molding.

When mica in the corona-resistant member is oriented as described above, the shape of the corona-resistant member may be, for example, a sheet shape, a plate shape, a cylindrical shape or a coat shape. Here, when in a member having the above-mentioned shape, mica is oriented so as to orthogonally cross the thickness direction of the member, excellent resistance to corona discharge caused by a voltage applied in the thickness direction of the member can be developed.

For example, in a sheet-shaped corona-resistant member, when a high frequency/high voltage is applied in the thickness direction of the sheet, i.e. a direction orthogonally crossing the sheet surface, an electrical tree develops in the thickness direction of the sheet due to corona discharge, but when mica is oriented as described above, development of the electrical tree can be most effectively inhibited, so that the life of the sheet-shaped corona-resistant member can be increased. The same applies for other shapes.

The corona-resistant member of the present invention can be used as a member required to have corona resistance. Examples of such a member include housings for ignition coils, insulated wires and electric insulation sheets.

EXAMPLES

The present invention will be described further in detail below by way of examples, but the present invention is not limited to examples below.

Examples 1 to 5 and Comparative Examples 1 to 3

In each of examples and comparative examples, a mixture obtained by dry-blending raw material components shown in Tables 1 and 2 was fed into a twin screw extruder with a cylinder temperature of 320° C. (mica and glass fibers were added separately from a side feed portion of the extruder), melted and mixed, and pelletized. Details of the raw material components shown in Tables 1 and 2 are described below.

(1) PAS Resin Component

PPS resin: Fortron KPS W214A manufactured by KUREHA CORPORATION (melt viscosity: 130 Pa·s (shear velocity: 1216 $sec^{-1}$, 310° C.))

The melt viscosity of the PPS resin was measured in the following manner.

(Measurement of Melt Viscosity of PPS Resin)

With the use of Capilograph manufactured by Toyo Seiki Seisaku-Sho, Ltd., a melt viscosity at a barrel temperature of 310° C. and a shear velocity of 1216 $sec^{-1}$ was measured using a 1 mm$\phi$×20 mmL/flat die as a capillary.

(2) Filler

Amber mica 1: 150-S manufactured by Western Japan Trading Co., Ltd. (average particle diameter (50% d): 163 μm)

Amber mica 2: 325-S manufactured by Western Japan Trading Co., Ltd. (average particle diameter (50% d): 30 μm)

Amber mica 3: 60-S manufactured by Western Japan Trading Co., Ltd. (average particle diameter (50% d): 278 μm)

Amber mica 4: 40-S manufactured by Western Japan Trading Co., Ltd. (average particle diameter (50% d): 351 μm)

White mica 1: AB-25S, manufactured by YAMAGUCHI MICA CO., LTD. (average particle diameter (50% d): 24 μm)

White mica 2: B-82 manufactured by YAMAGUCHI MICA CO., LTD. (average particle diameter (50% d): 137 μm)

Glass fibers 1: chopped glass fibers (ECS03T-747 manufactured by Nippon Electric Glass Co., Ltd.) (average fiber diameter: 13 μm)

The average particle diameter (50% d) of the filler was measured in the following manner.

(Measurement of Average Particle Diameter (50% d) of Filler)

A median diameter at 50% of the integrated value in a particle size distribution of each filler measured by a laser diffraction/scattering method under the following measurement conditions using a laser diffraction/scattering particle size distributionmeasuringapparatus LA-920 manufacturedbyHORIBA, Ltd.

— Measurement Conditions—

Circulation rate: 10

Laser light source: 632.8 nm He—Ne laser 1 mW, tungsten lamp 50 W

Detector: ring-shaped 75-split silicon photodiode×1, silicon photodiode×12

Dispersion medium: ultrapure water
Ultrasonic: applied
Transmittance: 80%
relative refractive indextowater: 1.18 (whitemica, amber mica)

From the pellets prepared in the manner described above, a test piece (flat plate) having a length of 80 mm, a width of 80 mm and a thickness of 1 mm was prepared at a cylinder temperature of 320° C. and a mold temperature of 150° C. using an injection molding machine (SE 100D manufactured by Sumitomo Heavy Industries, Ltd.), and the following evaluations were performed.

In preparation of test pieces using amber micas 1 to 4 and white micas 1 and 2, the position of the gate of the mold was set in such a manner that the orientation direction of each mica was identical to a resin flow direction for orienting the mica in a direction orthogonally crossing the thickness direction of the test piece.

(Corona Resistance Test)

A test piece 10 prepared in each of examples and comparative examples was fixed between a high-voltage-side electrode 12 (φ9.5 mm) and an earth-side electrode 14 (φ25 mm) as shown in FIG. 1, an applied voltage of 18 kV was applied with a frequency of 200 Hz at 130° C. in the air using a voltage resistance tester (YST-243 WS-28 manufactured by YAMAYOSHIKENKI COM.), and a time until occurrence of dielectric breakdown was measured. Measurement results are shown in Tables 1 and 2.

(Measurement of Mode Diameter of Filler in Molded Article)

A flat plate test piece of 80 mm×1 mm prepared in each of examples and comparative examples was left standing in the air at 600° C. for 5 hours to completely remove the resin component. From the resulting ash, a particle size distribution and a mode diameter for each filler was measured under the following conditions using a laser diffraction/scattering particle size distributionmeasuringapparatus LA-920 manufacturedbyHORIBA, Ltd.

—Measurement Conditions—
Circulation rate: 10
Laser light source: 632.8 nm He—Ne laser 1 mW, tungsten lamp 50 W
Detector: ring-shaped 75-split silicon photodiode×1, silicon photodiode×12
Dispersion medium: ultrapure water
Ultrasonic: applied
Transmittance: 80%
relative refractive indextowater: 1.18 (white mica, amber mica)

TABLE 2

| | | Comparative Example 1 | Comparative Example 2 | Comparative Example 3 |
|---|---|---|---|---|
| PAS component (parts by mass) | PPS resin | 100 | 100 | 100 |
| Filler (parts by mass) | Amber mica 4 | — | 53.62 | — |
| | Glass fibers 1 | — | — | 48.14 |
| Corona resistance test (hours) | | 12 | 40 | 31 |
| Mode diameter (μm) of filler in molded article | | — | 213 | — |

Figure 4:
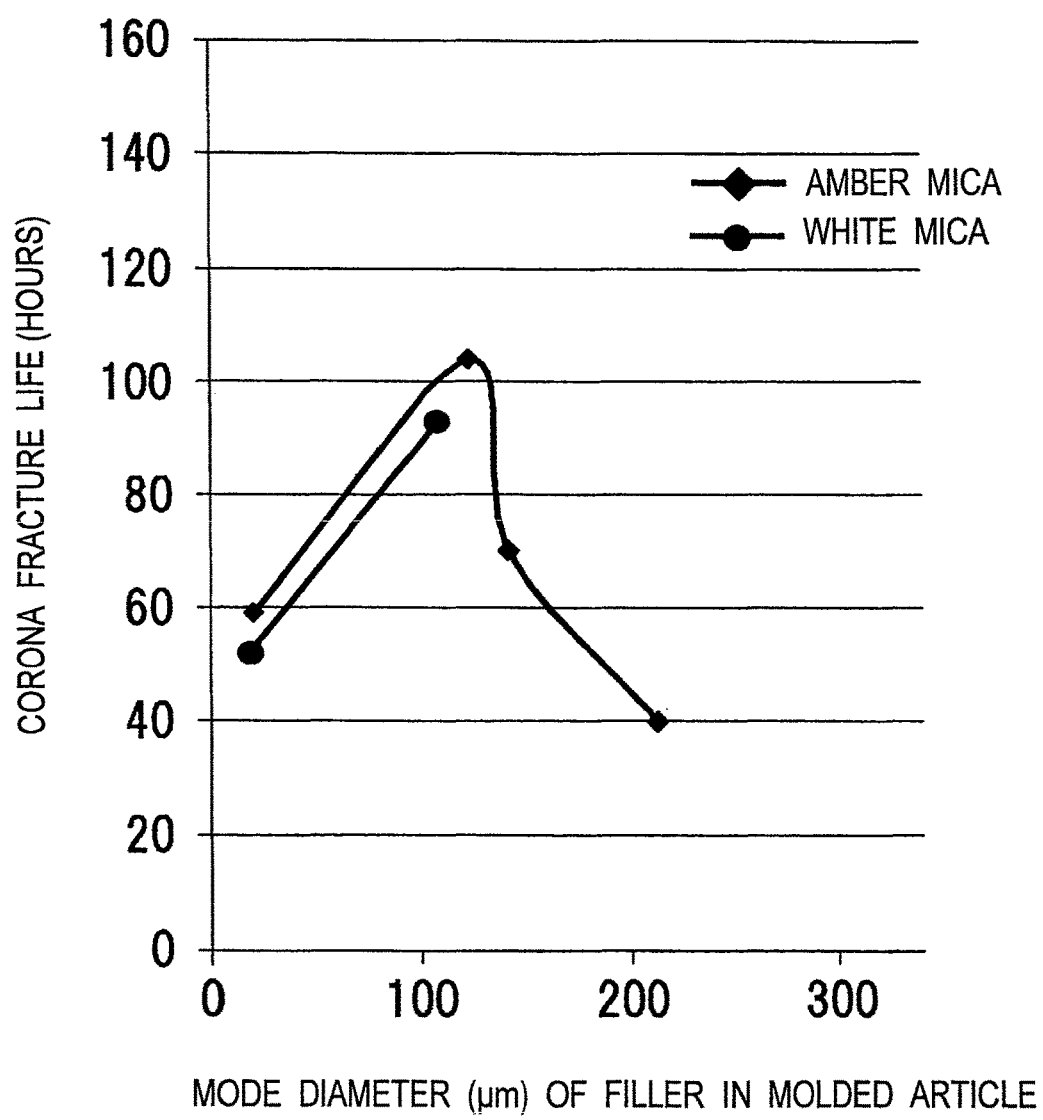
FIG. 4 is a graph illustrating a relationship between a mode diameter of each mica in a molded article and a corona fracture life when amber mica and white mica are used.

For Examples 1 to 3 and Comparative Example 2 using amber mica as a filler and Examples 4 and 5 using white mica as a filler, the relationship between the mode diameter of each mica in the molded article and the corona fracture life is shown in FIG. 4. From FIG. 4, it is apparent that corona fracture properties vary depending on a mode diameter of mica in the molded article, and in particular, amber mica has particularly excellent corona fracture properties at a mode diameter of 124 μm.

From Tables 1 and 2, it is apparent that in Examples 1 to 5 where mica was used, and the mode diameter of mica in the molded article (corona-resistant member) was in a range specified in the present invention, resistance lasted for a long period of time of more than 50 hours in the corona resistance test, while in Comparative Examples 1 to 3, the results of the test showed less than 50 hours, and thus satisfactory results could not be obtained.

REFERENCE SIGNS LIST

10 test piece
10A corona-resistant member
10B corona-resistant member
12 high-voltage-side electrode
14 earth-side electrode
16 mica

The invention claimed is:

1. A corona-resistant member formed by molding a corona-resistant resin composition obtained by melting and mixing at least a resin component and mica, wherein
   the resin component comprises a polyarylene sulfide resin, and
   a mode diameter of the mica in a volume-based particle size distribution measured by a laser diffraction/scattering method after molding is 100 to 200 μm,
   wherein the mica is oriented so as to orthogonally cross a direction of a voltage resulting from corona discharge.

TABLE 1

| | | Example 1 | Example 2 | Example 3 | Example 4 | Example 5 |
|---|---|---|---|---|---|---|
| PAS component (parts by mass) | PPS resin | 100 | 100 | 100 | 100 | 100 |
| Filler (parts by mass) | Amber mica 1 | 53.62 | — | — | — | — |
| | Amber mica 2 | — | 53.62 | — | — | — |
| | Amber mica 3 | — | — | 53.62 | — | — |
| | White mica 1 | — | — | — | 53.62 | — |
| | White mica 2 | — | — | — | — | 53.62 |
| Corona resistance test (hours) | | 104 | 58 | 70 | 52 | 93 |
| Mode diameter (μm) of filler in molded article | | 124 | 19 | 143 | 19 | 109 |

2. The corona-resistant member according to claim 1, wherein the corona-resistant member contains 25 to 101 parts by mass of the mica based on 100 parts by mass of the resin component.

3. The corona-resistant member according to claim 1, wherein a shape of the corona-resistant member is a sheet shape, a plate shape, a cylindrical shape or a coat shape.

4. The corona-resistant member according to claim 1, wherein the mode diameter of the mica in a volume-based particle size distribution measured by a laser diffraction/scattering method after molding is 100 to 130 μm.

5. The corona-resistant member according to claim 1, wherein the mode diameter of the mica in a volume-based particle size distribution measured by a laser diffraction/scattering method after molding is 109 to 130 μm.

6. The corona-resistant member according to claim 1, wherein the polyarylene sulfide resin is a polyphenylene sulfide resin.

7. A method for developing corona resistance of a resin molded article in which mica is added to a resin composition to develop corona resistance of a resin molded article obtained by molding the resin composition, wherein
the resin composition comprises a polyarylene sulfide resin, and
the mica is added in such a manner that a mode diameter of the mica in a volume-based particle size distribution measured by a laser diffraction/scattering method after molding is 100 to 200 μm,
wherein the mica is oriented so as to orthogonally cross a direction of a voltage resulting from corona discharge.

8. The method according to claim 7, wherein the mode diameter of the mica in a volume-based particle size distribution measured by a laser diffraction/scattering method after molding is 100 to 130 μm.

9. The method according to claim 7, wherein the mode diameter of the mica in a volume-based particle size distribution measured by a laser diffraction/scattering method after molding is 109 to 130 μm.

10. The method according to claim 7, wherein the polyarylene sulfide resin is a polyphenylene sulfide resin.

11. A corona-resistant member formed by molding a corona-resistant resin composition obtained by melting and mixing at least a resin component and mica, wherein
the resin component comprises a polyphenylene sulfide resin,
a mode diameter of the mica in a volume-based particle size distribution measured by a laser diffraction/scattering method after molding is 100 to 200 μm,
the corona-resistant member contains 25 to 101 parts by mass of the mica based on 100 parts by mass of the resin component,
the mica is oriented so as to orthogonally cross a direction of a voltage resulting from corona discharge, and
a shape of the corona-resistant member is a sheet shape, a plate shape, a cylindrical shape or a coat shape.

* * * * *